(12) United States Patent
Cooper et al.

(10) Patent No.: US 12,099,450 B1
(45) Date of Patent: Sep. 24, 2024

(54) CACHING ADDRESS TRANSLATION INFORMATION

(71) Applicant: Arm Limited, Cambridge (GB)

(72) Inventors: Richard Jared Cooper, Letchworth Garden (GB); Andreas Lars Sandberg, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/312,735

(22) Filed: May 5, 2023

(51) Int. Cl.
*G06F 12/10* (2016.01)
*G06F 12/1009* (2016.01)
*G06F 12/1027* (2016.01)

(52) U.S. Cl.
CPC ...... *G06F 12/1009* (2013.01); *G06F 12/1027* (2013.01)

(58) Field of Classification Search
CPC .......................... G06F 12/1009; G06F 12/1027
USPC ......................................................... 711/206
See application file for complete search history.

(56) References Cited

U.S. PATENT DOCUMENTS

| | | | | |
|---|---|---|---|---|
| 2017/0293565 | A1* | 10/2017 | Priyadarshi | G06F 12/0888 |
| 2019/0155748 | A1* | 5/2019 | Sandberg | G06F 12/109 |
| 2021/0073131 | A1* | 3/2021 | Krueger | G06F 12/109 |
| 2022/0413866 | A1* | 12/2022 | Nathella | G06F 9/30047 |

* cited by examiner

*Primary Examiner* — Than Nguyen
(74) *Attorney, Agent, or Firm* — NIXON & VANDERHYE P.C.

(57) ABSTRACT

Address translation circuitry is provided to perform address translation on receipt of a first address to generate a second address. The address translation circuitry comprises a page walk controller configured to perform sequential page table lookups in a plurality of page table levels of a page table hierarchy. Portions of the first address are used to index into sequential page table levels. Cache storage is provided to cache entries comprising translation information retrieved by the sequential page table lookups. An entry in the cache storage further comprises in association with the translation information a re-use indicator indicative of a re-use expectation for subsequent information which is subordinate to the translation information of the entry in the page table hierarchy. The address translation circuitry is configured to modify cache usage for the subsequent information in dependence on the re-use indicator.

20 Claims, 11 Drawing Sheets

CACHING ADDRESS TRANSLATION INFORMATION

TECHNICAL FIELD

The present disclosure relates to data processing. In particular, the present disclosure relates to address translation.

DESCRIPTION

A data processing apparatus may be required to translate between addressing schemes. A typical example of this is the use of virtual addresses within a data processor, which has access to a memory system in which physical addresses are used. In order to communicate with the memory system, the data processor is therefore provided with the capability to translate virtual addresses into physical addresses. The mappings between virtual and physical addresses may themselves be stored in the memory system and therefore need to be retrieved for use. Furthermore, where the data processor may access the same addresses repeatedly within a short time period, caching storage for address translations may be provided, in order to reduce the time required for a given address translation to be retrieved. The caching storage available for address translations will necessarily be limited and therefore careful administration of which address translations are currently cached is beneficial.

SUMMARY

In one example embodiment described herein there is address translation circuitry responsive to receipt of a first address to perform address translation to generate a second address, the address translation circuitry comprising:
  a page walk controller configured to perform sequential page table lookups in a plurality of page table levels of a page table hierarchy, wherein pointers retrieved from preceding page table levels point to subsequent page table levels and the page walk controller is configured to use corresponding address portions of the first address to select the pointers from the preceding page table levels; and
  cache storage configured to cache entries comprising translation information retrieved by the sequential page table lookups;
  wherein an entry in the cache storage further comprises in association with the translation information a re-use indicator indicative of a re-use expectation for subsequent information which is subordinate to the translation information of the entry in the page table hierarchy, and wherein the address translation circuitry is configured to modify cache usage for the subsequent information in dependence on the re-use indicator.

In another example embodiment described herein there is a method of address translation for receiving a first address and generating a second address, the method comprising:
  performing sequential page table lookups in a plurality of page table levels of a page table hierarchy, wherein pointers retrieved from preceding page table levels point to subsequent page table levels and corresponding address portions of the first address are used to select the pointers from the preceding page table levels;
  caching entries in cache storage comprising translation information retrieved by the sequential page table lookups,
  wherein an entry in the cache storage further comprises in association with the translation information a re-use indicator indicative of a re-use expectation for subsequent information which is subordinate to the translation information of the entry in the page table hierarchy; and
  modifying cache usage for the subsequent information in dependence on the re-use indicator.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
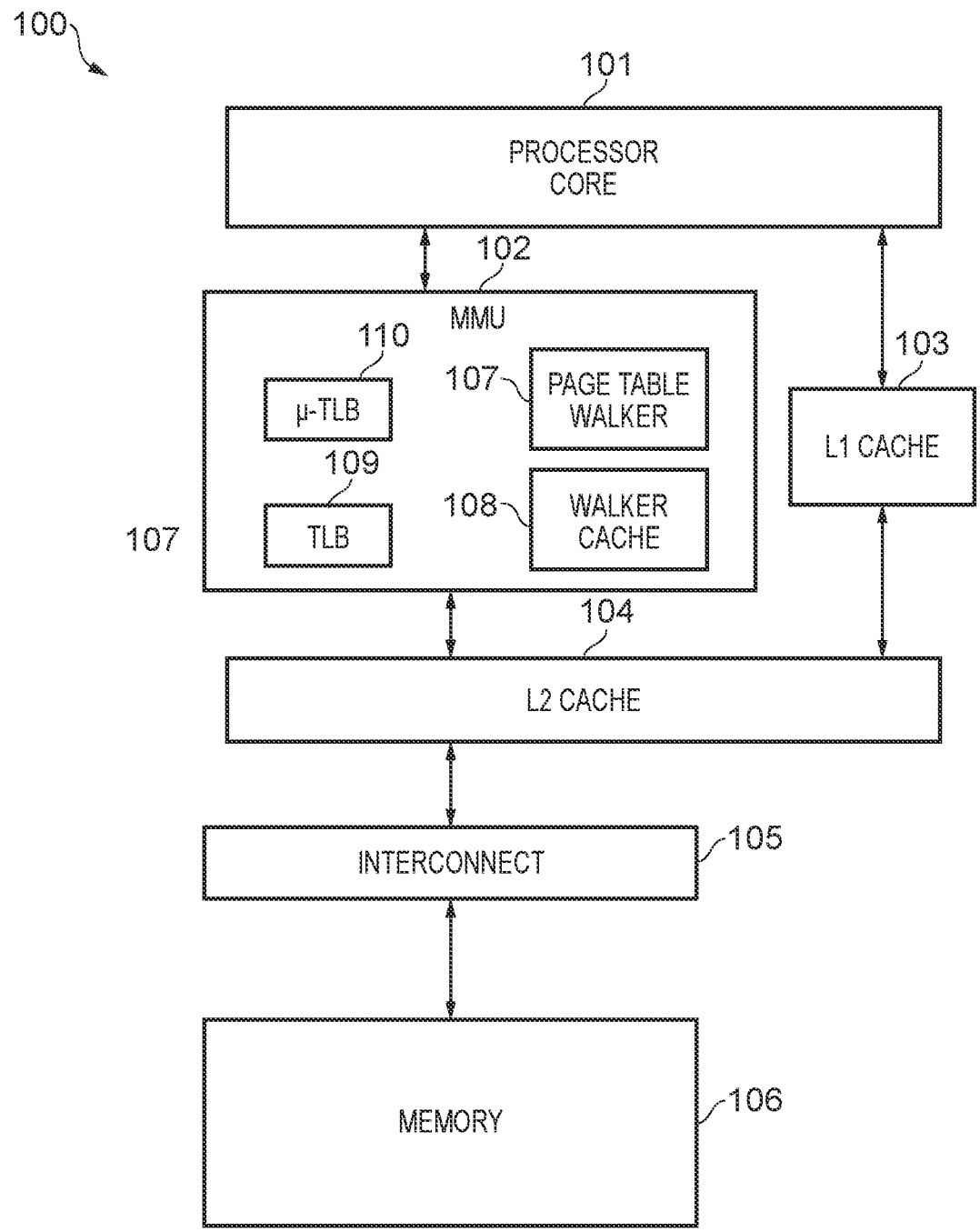
FIG. 1 schematically illustrates a data processing apparatus comprising address translation circuitry in accordance with some examples.

Before discussing the embodiments with reference to the accompanying figures, the following description of embodiments is provided.

In accordance with one example configuration there is provided address translation circuitry responsive to receipt of a first address to perform address translation to generate a second address, the address translation circuitry comprising:
  a page walk controller configured to perform sequential page table lookups in a plurality of page table levels of a page table hierarchy, wherein pointers retrieved from preceding page table levels point to subsequent page table levels and the page walk controller is configured to use corresponding address portions of the first address to select the pointers from the preceding page table levels; and cache storage configured to cache entries comprising translation information retrieved by the sequential page table lookups;

wherein an entry in the cache storage further comprises in association with the translation information a re-use indicator indicative of a re-use expectation for subsequent information which is subordinate to the translation information of the entry in the page table hierarchy, and wherein the address translation circuitry is configured to modify cache usage for the subsequent information in dependence on the re-use indicator.

The hierarchical nature of the plural page table levels of a page table hierarchy means that sequential page table entries encountered as part of a page table walk penetrating the page table hierarchy will each correspond to sequentially smaller memory regions, since the set of address translations covered by a preceding page table level entry are a superset of the set of address translations covered by a subsequent page table level entry. At the finest level of granularity a last page table level entry will correspond to a block of address translations, whereby a specific address translation from amongst this block is typically selected using a lower-significance offset portion of the input (e.g. virtual) address. Within the address translation circuitry the provision of cache storage configured to cache entries comprising translation information retrieved by the sequential page table lookups means that the full page table walk need not be carried out for each new address translation request, but instead where new requests correspond to at least one level of granularity of a recently performed address translation, a cached corresponding page table entry or cached corresponding walker cache entry can be re-used. In the idealised scenario that large regions of memory are accessed by sequential memory address, the caching of page table entries would proceed in a correspondingly idealised manner as the page table hierarchy is iterated through, accessing sequential page table entries at each level. Of course, real-world memory accesses rarely follow such a pattern. In particular, the inventors of the present techniques have realised that certain memory access patterns can result in particularly poor usage of typical address translation caching capabilities.

For example the lowest level (finest granularity) address translation caching is commonly aligned with a page of address translations (e.g. 4 kB in size). Where memory address accesses exhibit a sufficient degree of spatial locality (i.e. two memory accesses are close to one another in storage location) and temporal locality (i.e. the two memory accesses occur within a short time span), generally such address translation caching and page sizing works well. However, problematic behaviour can occur, for example when working with data sets comprising large objects which span areas of memory larger than the page size. In this situation, accessing a sequence of such objects, regardless of whether that sequence resides in directly sequential regions of memory, will mean that the finest granularity address translation caching entries will be updated for each access. This lowest level address translation cache will thus "thrash" and not support repeated (temporally local) address translations as intended.

The present techniques address this issue through the provision of a re-use indicator in an entry in the cache storage, where the entry relates to a re-use expectation of address translation information at a subsequent level of the page walk process. For example, the re-use indicator can be associated with a penultimate page table level, giving information about the re-use expectation of address translation information at a final page table level. In particular it is intended that the re-use indicator can be used to indicate when it is expected that the address translation information at the subsequent level will not be re-used well (for example that it will exhibit poor temporal locality). Further, the address translation circuitry is configured to modify cache usage for the subsequent information in dependence on the re-use indicator. Thus, for example when it is expected that the address translation information at the subsequent level will not be re-used well, the re-use indicator can be used as a trigger for control of the caching at the subsequent level to suppress caching of the subsequent information at that level. Nevertheless, caching suppression is not the only action proposed as a possible reaction to the re-use indicator, for example an insertion policy for the cache storage could be modified in dependence on the re-use indicator. The present techniques are not limited to any particular manner of modifying the cache usage in dependence on the re-use indicator.

The cache storage may take a variety of forms. Although operating to cache translation information from multiple page table levels of a page table hierarchy, the cache storage may be essentially unitary, with further information associated with the translation information being indicative of the level of a page table hierarchy to which it belongs. Alternatively, the cache storage itself may be hierarchical, being formed of more than one cache level. In some examples, the cache storage is walker cache storage and the translation information comprised in the entries comprises the pointers retrieved as part of the sequential page table lookups in association with the corresponding address.

In some examples, the ability to cache address translations themselves may be provided and in some such example the address translation circuitry further comprises a translation lookaside buffer configured to cache first-to-second address translations, wherein the subsequent information which is subordinate to the translation information of the entry in the page table hierarchy comprises at least one first-to-second address translation cached in the translation lookaside buffer. Hence in such examples, the re-use indicator can be provided in cached entries at a cache storage level above the translation lookaside buffer in a caching hierarchy (for example associated with a last page table level cached entry) and provide information about a re-use expectation for corresponding entries in the translation lookaside buffer.

The re-use indicator may take a variety of forms. In its simplest form, it may be provided by a binary flag. However, it may also be provided in a multiple-bit form, allowing a range of indications of re-use expectation to be held. In some examples, the re-use indicator comprises a counter, wherein a value indicated by the counter is configured to be modified in response to a predefined event relating to at least part of the subsequent information and wherein the address translation circuitry is configured to modify the cache usage for the subsequent information when a result of modification of the value of the counter satisfies a predefined criterion. Both the predefined event and the predefined criterion may be variously defined.

In some examples, the predefined event comprises a caching eviction of the at least part of the subsequent information. Thus the counter may be arranged to count evictions. This may for example be set up such that the counter increments for each corresponding eviction and the modification of the cache usage for the subsequent information may be triggered when the counter reaches a defined threshold value. Alternatively, the counter may be arranged to decrement towards a defined (lower) threshold value. Further, the predefined criteria which trigger the modification of the cache usage may comprise the counter value meeting and subsequently falling below a threshold value.

Further conditions may also be added and in some examples it is defined that prior to the caching eviction the at least part of the subsequent information has not been re-used after an initial access which cause it to be cached. Equally it may be defined that prior to the caching eviction the at least part of the subsequent information has been re-used after an initial access which cause it to be cached. Other definitions may solely consider re-use of cached entries.

In some examples, the counter is a saturating counter configured to saturate at a threshold value.

In some examples, the address translation circuitry further comprises a saturation indicator configured to indicate that the saturating counter has reached the threshold value. The saturation indicator may form part of the predefined criteria which trigger the modification of the cache usage.

In some examples, the counter is configured to be periodically modified in a reverse direction. Thus for example, whilst the counter could be configured to increment (upwards) in response to certain events (such as evictions), the counter could then be configured to decrement (downwards) after the elapse of a defined time period, which may be measured in clock cycles. Equally, the period may instead be defined by a number of address translations handled by the address translation circuitry.

In some examples, the predetermined criterion comprises saturation of the counter followed by return to a further threshold value.

In some examples, the counter is configured to monotonically increment. In such examples the counter will then typically saturate at a maximum value, being reset when the counter is evicted.

In some examples, the counter is configured to be modified in a reverse direction in response to re-use of the subsequent information. Thus for example, the counter may be incremented when the subsequent information is evicted and decremented when the subsequent information is re-used. The value of the counter can then be used as an indication of the relative frequencies of evictions and re-use for particular cached information. The higher the value, the more frequently evictions are occurring relative to re-use and thus the less well the caching is working for that information. Conversely, the lower the value, the more frequently re-use is occurring relative to evictions and thus the better the caching is working for that information.

In some examples, the re-use of the subsequent information is a first re-use of the subsequent information. Where the re-use indicator can correspond to multiple items of subsequent information (e.g. a counter in a final level walker cache can be associated with multiple leaf page table entries), counting the first re-use of the subsequent information (a TLB entry in this example) will give an indication of how many of those multiple items of subsequent information were re-used (but not whether they were each re-used many times). Accordingly, this configuration can be used to provide an indication of the coverage of that (higher level) entry (though not the frequency of re-use of the (lower level) items). By contrast, counting all re-uses of the multiple items of subsequent information covered by a re-use indicator (at a level above) provides an indication of the frequency of re-use across all the multiple items of subsequent information. However, this approach does not distinguish between one item being re-used often and many items being re-used once each. So this option gives an indication of how heavily the entry (and the multiple items it covers) is being used, but not of the coverage per se.

In some examples, the re-use indicator comprises a settable value and the address translation circuitry is configured to modify cache usage for the subsequent information when the settable value meets at least one predefined criterion. Configuring the re-use indicator as a settable value provides further flexibility in the usage of this feature. For example, the setting of the value may be caused by a range of agents, from the programmer of the system which comprises the address translation circuitry to components (whether hardware or software) of that system which are configured to change the settable value in defined circumstances.

Thus in some examples, the address translation circuitry is configured to modify the settable value in response to a software or operating system command to do so.

In some examples, the address translation circuitry is configured to modify the settable value in response to eviction behaviour related to the subsequent information. Thus, the address translation circuitry can monitor the caching of the subsequent information and in particular evictions of the subsequent information, and in response (e.g. to frequent evictions occurring) can modify the settable value, which in turn will modify the cache usage for the subsequent information. For example, caching of frequently evicted items can be suppressed to avoid cache thrashing.

In some examples, the address translation circuitry is configured, when the entry is evicted from the cache storage to cause the re-use indicator to be evicted in association with the entry and written back to further storage, such that when the translation information is retrieved again as part of a later page table lookup the re-use indicator is also retrieved having a state it had when the entry was evicted. In this manner the information represented by the re-use indicator is preserved when the entry itself is evicted and hence if it has been "learned" that the subsequent information covered by this entry results in poor cache usage and so caching for that subsequent information has been suppressed (by suitable setting of the re-use indicator), this does not need to be "re-learned" when the entry is retrieved again.

The modifying of the cache usage for the subsequent information in dependence on the re-use indicator may take various forms, but in some examples the cache storage is configured to suppress caching of the subsequent information in dependence on the re-use indicator.

In some examples, the address translation circuitry is configured to modify an insertion policy for the cache storage in dependence on the re-use indicator. For example, the cache storage could insert entries into the least-recently-used position instead of the most-recently-used position.

In some examples, the address translation circuitry is configured to modify an insertion policy for the translation lookaside buffer in dependence on the re-use indicator. In some examples, the address translation circuitry is configured to modify an insertion policy for subordinate levels of the walker cache in dependence on the re-use indicator.

In some examples, the address translation circuitry is configured to signal information to a data cache control in dependence on the re-use indicator to cause the data cache control to modify cache usage for entries in a data cache which are associated by data processing operations with the subsequent information. Poor cache usage for certain address translations may also mean that data items retrieved from memory locations to which those address translations point may also suffer from poor cache usage (in a data cache). Accordingly, the information represented by a re-use indicator relating to address translation caching may also be useful in controlling (e.g. suppressing) the caching of related data items in a data cache.

In some examples, the address translation circuitry further comprises multiple translation lookaside buffers configured to cache first-to-second address translations, and wherein modifying the cache usage for the subsequent information in dependence on the re-use indicator comprises suppressing caching of address translations in a first one of the multiple translation lookaside buffers, but continuing to cache the address translations in a second one of the multiple translation lookaside buffers. The multiple translation lookaside buffers may for example comprise one or more of each of a micro TLB, an L1 TLB, a L2 TLB (and possibly further levels). Further, the multiple translation lookaside buffers may be inclusive, semi-inclusive, or exclusive with respect to one another, depending on the configuration. The suppression of caching in one TLB and the continuation of caching in another TLB may be variously arranged, but in one example, the L2 TLB is suppressed when poor re-use is found, but L1 TLB caching continues, since the L1 TLB is smaller and may continue to cover short term usage patterns whilst the larger L2 TLB is associated with longer term usage patterns.

In accordance with one example configuration there is provided a method of address translation for receiving a first address and generating a second address, the method comprising:
  performing sequential page table lookups in a plurality of page table levels of a page table hierarchy, wherein pointers retrieved from preceding page table levels point to subsequent page table levels and corresponding address portions of the first address are used to select the pointers from the preceding page table levels;
  caching entries in cache storage comprising translation information retrieved by the sequential page table lookups,
  wherein an entry in the cache storage further comprises in association with the translation information a re-use indicator indicative of a re-use expectation for subsequent information which is subordinate to the translation information of the entry in the page table hierarchy; and
  modifying cache usage for the subsequent information in dependence on the re-use indicator.

Particular embodiments will now be described with reference to the figures.

Figure 2:
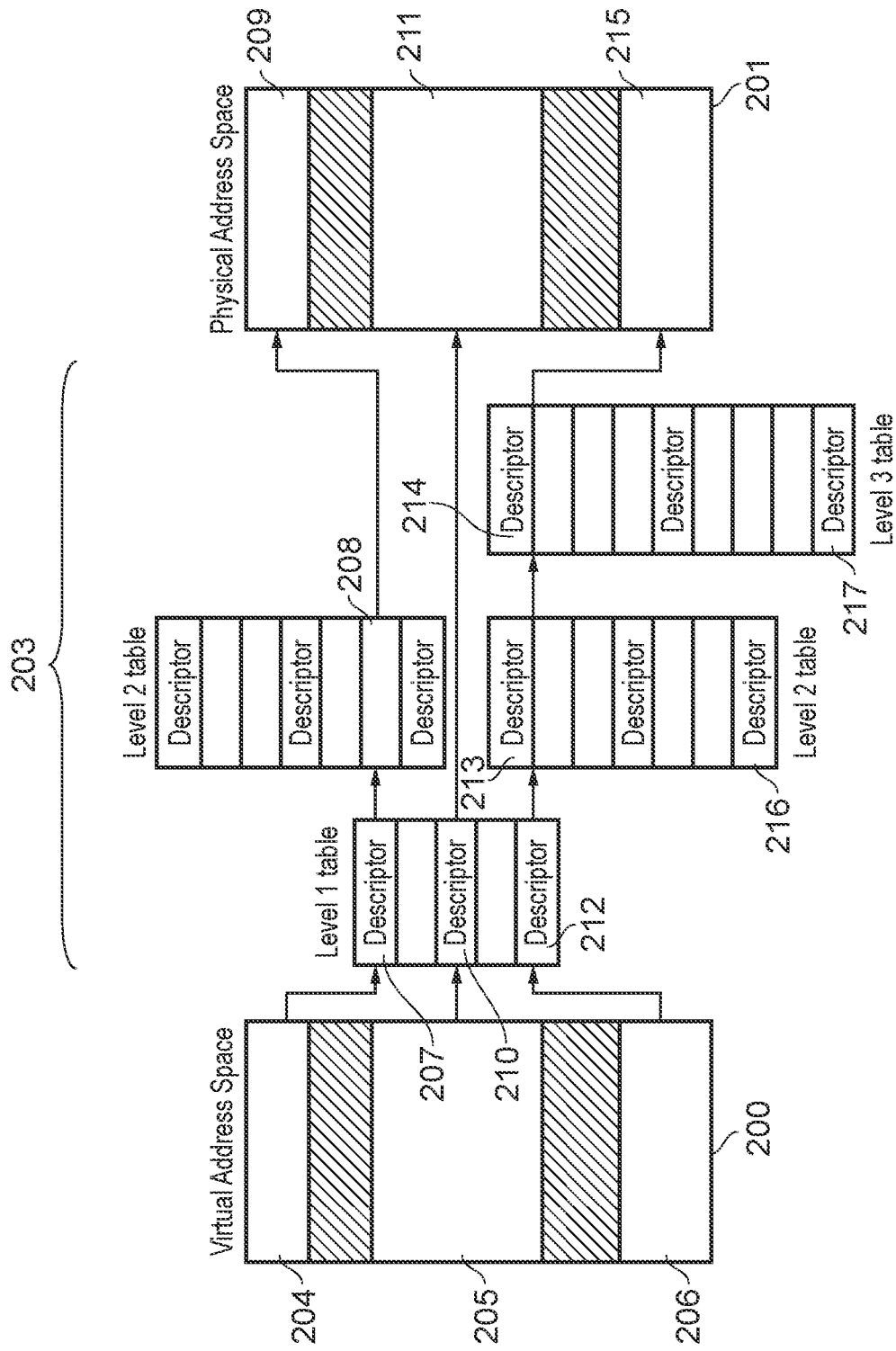
FIG. 2 schematically illustrates virtual to physical address translation in accordance with some examples.

FIG. 1 illustrates a data processing apparatus 100 in accordance with one example. The apparatus, which may be viewed as a general-purpose data processing apparatus, comprises a processor core 101, which is configured to perform data processing operations. These data processing operations are defined by instructions, which are stored in and retrieved from memory 106. The instructions define the data processing operations to be carried out with respect to specified data items, which are stored in, retrieved from, and written back to memory 106. In order to avoid the full latency associated with accessing the memory 106, the data processing apparatus 100 is provide with a cache hierarchy, in this example comprising L1 cache 103 and L2 cache 104. FIG. 1 further shows the data processing apparatus 100 to comprise a memory management unit (MMU) 102 and an interconnect 105. A primary function of the MMU 102 is to perform address translation. Generally speaking, address translation is the process of receiving a first address (in a first addressing scheme) and generating a corresponding second address (in a second addressing scheme). In the context of the example of FIG. 1, the MMU 102 translates virtual addresses (used internally by the processor core 101) into physical addresses (used to reference storage locations in the memory 106). The definitions of address translations are themselves stored in memory 106 in the form of page tables, which are retrieved as required by the MMU 102. The page tables are defined in a hierarchical manner (as a page table hierarchy) and the process of accessing this hierarchy is a page table walk, which is administered by the page table walker (page table walk controller) 107. A page table hierarchy is shown in FIG. 2 and discussed further below. In addition the MMU 102 comprises various cache storage, in the example of FIG. 1 these being shown as walker cache 108, translation lookaside buffer (TLB) 109, and micro-TLB 110. Various address translation information retrieved by the page table walk process is cached in the cache storage, in order to reduce the address translation latency for repeated requests to the same or similar address regions. Broadly expressed, intermediate translation information (relating to pointers to subsequent page tables) is cached in the walker cache 108, whilst resulting address translations themselves are cached in the TLB 109 and micro-TLB 110. As discussed in more detail elsewhere herein, the present techniques comprise the addition of a re-use indicator to a translation information entry in cache storage, where the re-use indicator is indicative of a re-use expectation for subsequent information which is subordinate to the translation information of the entry in the page table hierarchy. Hence, one example of this in the context of FIG. 1 would be an entry in the walker cache 108 being supplemented with a re-use indicator, where the re-use indicator gives an expectation of re-use for the content of the TLB 109 that is subordinate to this 'parent' entry in the walker cache. The MMU would then control the cache usage with respect to that TLB content in dependence on the status of the re-use indicator. To take this specific example further, the re-use indicator might be set in the entry in the walker cache 108 when it is observed (or expected) that the corresponding TLB content is exhibiting poor caching behaviour, i.e. the cached TLB content is not being re-used (enough or perhaps indeed at all) before being evicted. Setting the re-use indicator in the entry in the walker cache can then for example cause caching of that TLB content to be suppressed, such that the TLB 109 can be more profitably used for caching other content. Nevertheless, it should be appreciated that this is just one possible implementation of the present techniques, and a re-use indicator may be deployed at any level of address translation caching, where it gives information on a re-use expectation for subsequent information that is subordinate to the point at which it is deployed. Moreover caching suppression is only one example of the effect of the re-use indicator and other aspects of caching behaviour (such as an insertion policy) may also/instead be controlled. Further usage examples will be apparent from the description of the other figures that follow.

FIG. 2 schematically illustrates virtual to physical address translation in accordance with some examples. The mapping of a virtual address space 200 to a physical address space 201 via a page table hierarchy 203 is shown. A set of virtual addresses 204 maps via an L1 page table entry 207 and an L2 page table entry 208 to a set of physical addresses 209. A further, larger set of virtual addresses 205 maps via just an L1 page table entry 210 to a correspondingly large set of physical addresses 211. Another set of virtual addresses 206 maps via an L1 page table entry 212, an L2 page table entry 213, and an L3 page table entry 214 to a set of physical addresses 215. The hierarchical nature of the page table hierarchy 203 means that the application of the present techniques in the context of FIG. 2 could for example comprise the implementation of a re-use indicator in the entry (descriptor) 210 of the L1 table which would correspond to all of the physical addresses 211. The setting of this re-use indicator in the entry (descriptor) 210 of the L1 table could therefore be used to control caching behaviour relating to all of the physical addresses 211. As another example, the implementation of a re-use indicator in the entry (descriptor) 212 of the L1 table would correspond to all subsequent translation information, i.e. that of the L2 table 216 and the L3 table 217 and the full address translations corresponding to the addresses 215 (and all other translation information which is subordinate to the entry 212 of the L1 table—not shown in FIG. 2). The caching behaviour of all this subsequent translation information can then be controlled on the basis of the re-use indicator in the entry (descriptor) 212 of the L1 table.

Figure 3:
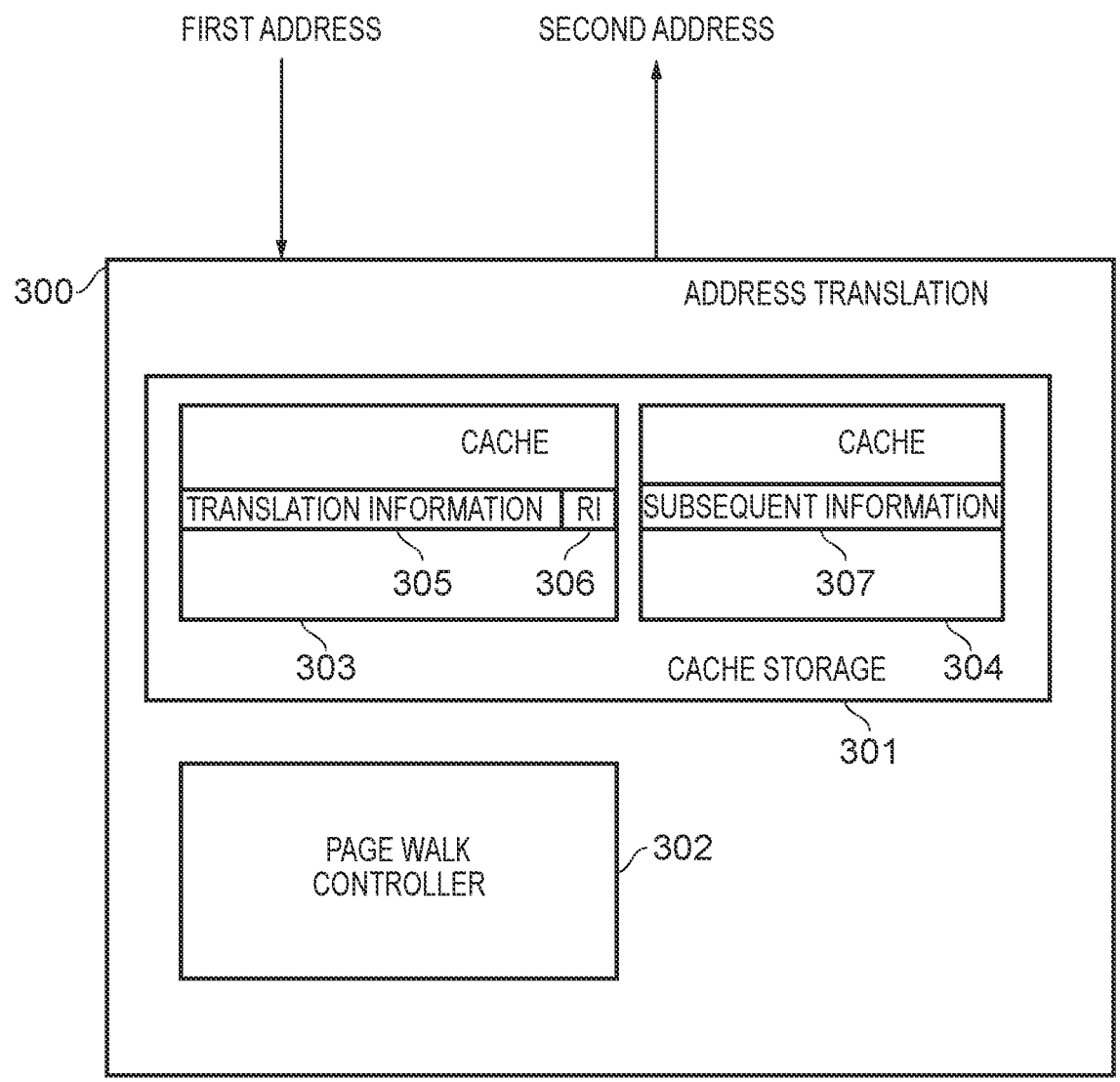
FIG. 3 schematically illustrates address translation circuitry in accordance with some examples.

FIG. 3 schematically illustrates address translation circuitry 300 in accordance with some examples, showing a high-level overview of the present techniques. Address translation circuitry 300 is responsive to receipt of a first address to perform address translation to generate a second address. The address translation circuitry 300 comprises cache storage 301 and a page walk controller 302. On receipt of the first address, if a full translation is available in the cache storage 301, then this is provided as the second address. Otherwise, the page walk controller commences an at least partial page walk process on the basis of a page table hierarchy. Translation information retrieved from the page table hierarchy can be cached in the cache storage. For example, a pointer retrieved from a first page table that leads to a second page table can be cached (in association with a corresponding portion of the first address), to enable that step to be performed more quickly when repeated for the same portion of the first address. The page walk controller uses a corresponding address portion of the first address to select the pointer to a next page table from a preceding page table. The cache storage 301 is shown to comprise two parts, cache 303 and cache 304. This may be a physical division into two separately controlled cache structures or may be a nominal sub-division of the storage capacity of a single cache structure represented by cache storage 301. In accordance with the present techniques, a re-use indicator (RI) 306 is stored in association with the translation information 305 cached in cache 303. This re-use indicator 306 indicates a re-use expectation for subsequent information 307, which is cached in cache 304. The subsequent information 307 is subordinate to the translation information 305 by virtue of their relationship in the page table hierarchy that supports the address translation process. The address translation circuitry is configured to modify cache usage for the subsequent information 307 in dependence on the re-use indicator 306. This cache usage may take various forms.

Figure 4A:
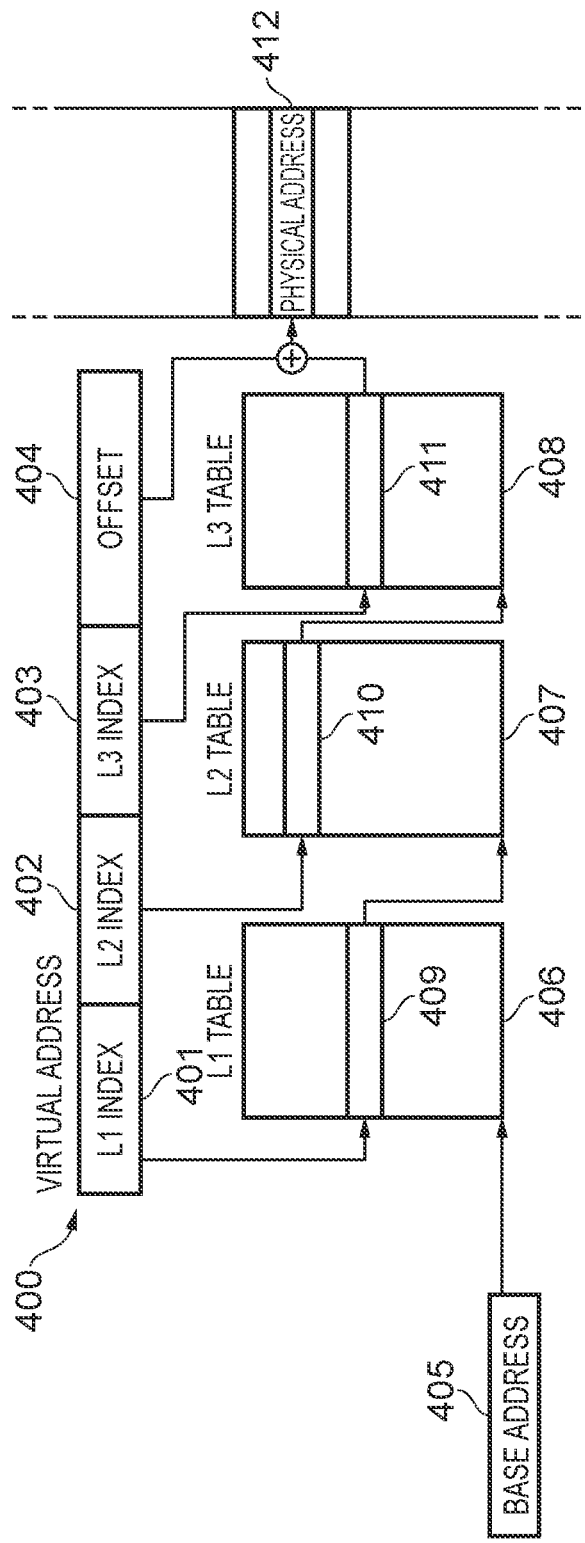
FIG. 4A schematically illustrates the use of portions of a virtual address being used to select entries from a sequence of page tables in a page table walk process to translate the virtual address into a physical address in accordance with some examples.

FIG. 4A schematically illustrates the use of portions of a virtual address being used to select entries from a sequence of page tables in a page table walk process to translate the virtual address into a physical address in accordance with some examples. As shown, there are three levels to the page table hierarchy, i.e. L1, L2, and L3. The page table walk is conducted by subdividing an incoming (virtual) address 400 into portions, where respective portions are used to select a given page table entry from within a page table. Thus, as a first step, a defined base address pointer 405 indicates the address of the L1 table 406 and a first portion 401 of the virtual address 400 is used as an index to select a particular page table entry 409 within the L1 page table 406. The page table entry 409 provides a pointer to the address of the L2 table 407 and a second portion 402 of the virtual address 400 is used as an index to select a particular page table entry 410 within the L2 page table 407. The page table entry 410 provides a pointer to the address of the L3 table 408 and a third portion 403 of the virtual address 400 is used as an index to select a particular page table entry 411 within the L3 page table 408. Finally, content of the page table entry 411 in the L3 page table 408 is combined with a final "offset" portion 404 of the virtual address 400 to generate the translated physical address 412.

Figure 4B:
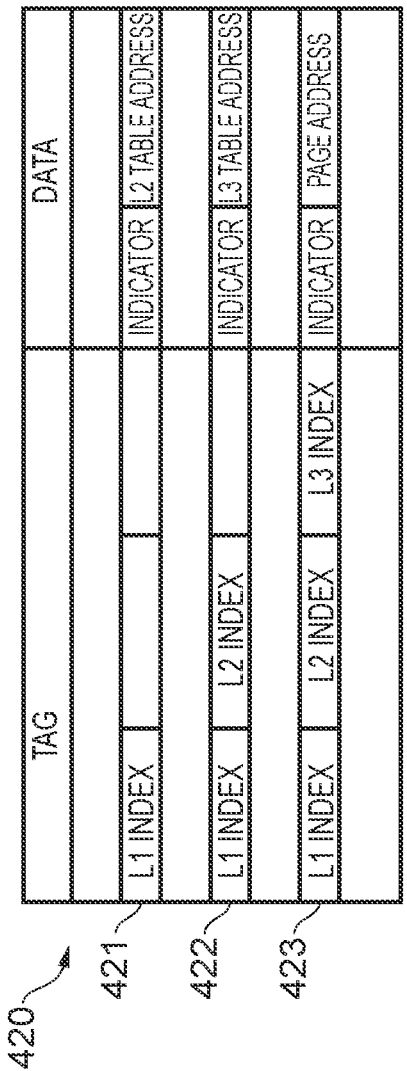
FIG. 4B schematically illustrates cache storage content in accordance with some examples.

The caching of translation information retrieved by the sequential page table lookups of the page table walk process is now discussed with reference to FIG. 4B, which schematically illustrates cache storage content in accordance with some examples. As will be familiar to one of ordinary skill in the art the cache storage 420 shown in FIG. 4B is arranged to store entries, which comprise tag information and associated data. The tag information is based on portions of the virtual address 400. The data stored comprises translation information retrieved by the page walk process. Each entry also comprises a re-use indicator associated with the translation information. Other relevant metadata (e.g. permissions, memory attributes, and so on may also be stored in each entry). The three example cache entries shown in FIG. 4B respectively correspond to the three stages of the page walk process (i.e. accessing an L1, L2, and L3 page table respectively). Thus in the entry 421 the tag information stored is the L1 index (i.e. the first portion 401 of the virtual address 400) and the associated data is a re-use indicator and the pointer to the L2 table 407. In the entry 422 the tag information stored is the L1 index and the L2 index (i.e. the first two portions 401 and 402 of the virtual address 400) and the associated data is a re-use indicator and the pointer to the L3 table 408. In the entry 423 the tag information stored is the L1, L2, and the L3 indices (i.e. the first, second, and third portions 401, 402, 403 of the virtual address 400) and the associated data is a re-use indicator and a page table entry (providing the physical page address pointer and other metadata (e.g. permissions, memory attributes, and so on), such that (steered by offset 404) the full address translation can be made based on this information. As such it will be appreciated that the entry 423 is essentially a TLB entry, with cache storage 420 depicting a combined walker cache and TLB. Accordingly, for a further virtual address which is received by the address translation circuitry, three different degrees of matching could occur when a look up in the cache storage 420 is performed, corresponding to the degree of matching between the further virtual address and the L1, L2, and L3 index portions present in the tag part of cache storage 420. Correspondingly, part or all of a page walk process for the further virtual address may be avoided. Furthermore, the status of the respective re-use indicator in an entry for which the further virtual address hits can, according to the present techniques, be used to control cache usage for address translation information which is subordinate to the address translation information in the entry. Hence, for the entry 421, the re-use indicator can be used to indicate a re-use expectation and to control a cache usage policy for translation information pertaining to any or all of the L2 page table level, the L3 page table level, and/or a full address translation. For the entry 422, the re-use indicator can be used to indicate a re-use expectation and to control a cache usage policy for translation information pertaining to any or all of the L3 page table level and/or a full address translation. For the entry 423, it should be appreciated that the re-use indicator may not be provided in some embodiments, because the entry itself comprises full address translation information (in the manner of a TLB entry), however in other embodiments the re-use indicator is indeed provided and can be used to indicate a re-use expectation and to control a cache usage policy either for different levels of the TLB or for the data caches (storing data retrieved from a physical address generated from this translation information).

Figure 5:
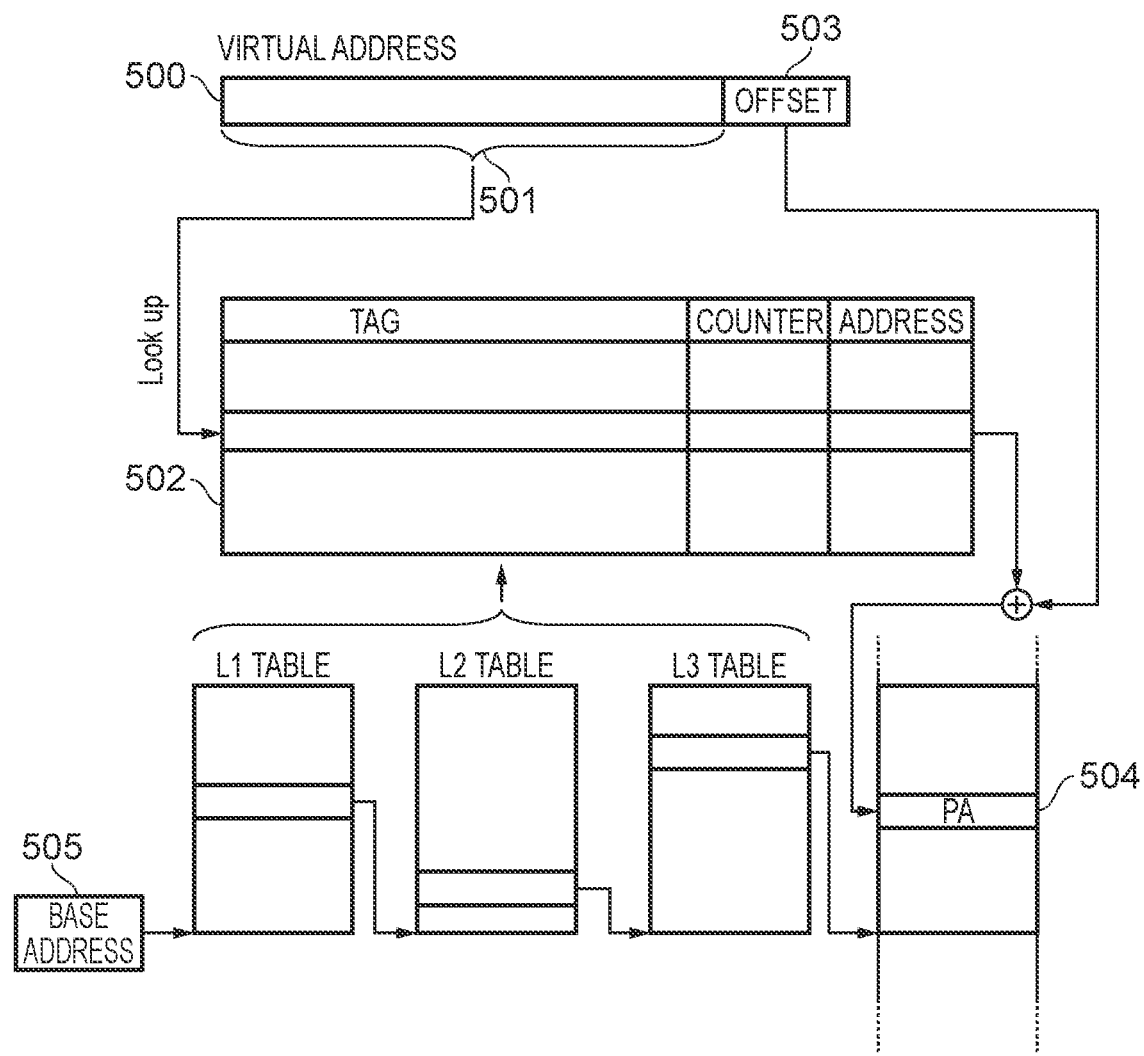
FIG. 5 schematically illustrates the use of walker cache storage to store partial address translations and the use of a partial address translation to generate a physical address in accordance with some examples.

FIG. 5 schematically illustrates the use of a combined walker cache and TLB storage to store partial address translations and the use of a partial address translation to generate a physical address in accordance with some examples. A virtual address 500 is received for address translation and a tag portion 501 of the address is taken and used in the performance of a look-up in a combined walker cache/TLB 502. The walker cache/TLB is populated by address translation information retrieved from a page table hierarchy and its entries comprise corresponding pointers. In the example illustrated, the tag portion 501 of the address 500 hits on an entry which holds address translation information retrieved from an L3 page table and therefore this address translation information can be directly combined with the offset portion 503 of the virtual address to generate the translated physical address, which indicates the memory location 504. The page table hierarchy shown begins with a pointer ("base address") stored in a register 505. A number of such base addresses may be employed each pointing to a different page table hierarchy, such that for example different processes can be allocated their own virtual address spaces. Thus on a context switch between processes a corresponding different base address may be loaded into the base address register to configure the page table walk process.

Figure 6:
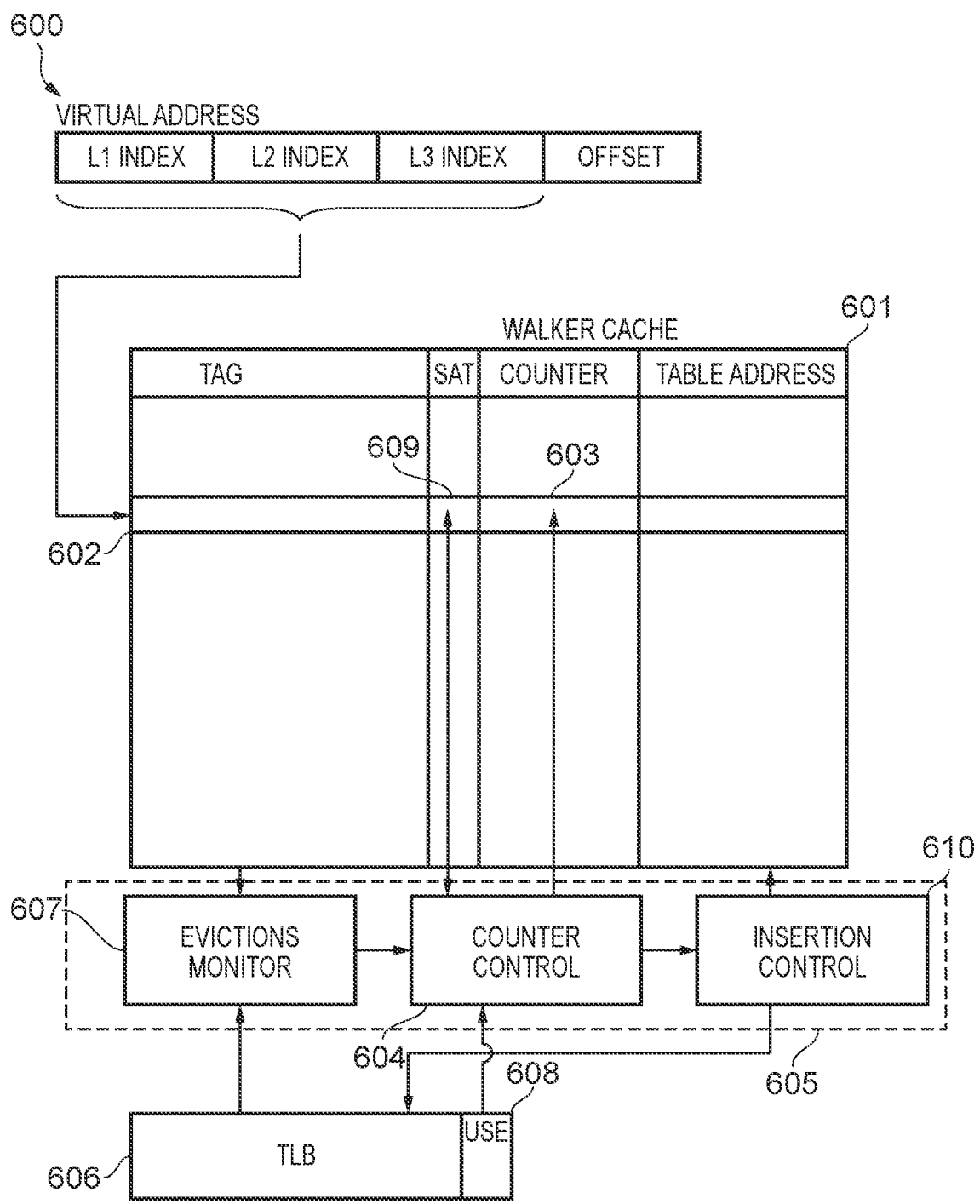
FIG. 6 schematically illustrates address translation circuitry comprising a walker cache storage and a translation lookaside buffer in accordance with some examples.

FIG. 6 schematically illustrates address translation circuitry comprising a walker cache storage 601 and a translation lookaside buffer 606 in accordance with some examples. Here a virtual address 600 is to be translated into a physical address and so the tag portion of the address (providing the L1, L2, and L3 page table indices) is the basis of a lookup in the walker cache 601. In the example shown, there is a hit in entry 602. Moreover, in this example the re-use indicator of the entry takes the form of a counter 603, the value of which is administered by counter control 604 associated with the walker cache 601. The counter control 604 forms part of the cache control circuitry 605 for the walker cache 601. The counter control 604 can be variously configured, i.e. such that the counter value of the counter 603 is updated in response to various caching-related events that concern the subsequent translation information that is subordinate to this entry 602. In one example, the relevant events are cache-evictions, in particular of address translations that are cached in the TLB 606. Thus, in this arrangement, when an eviction occurs in the TLB 606, this event is signalled to the evictions monitor 607, which also receives content information from the walker cache 601. A corresponding entry in the walker cache 601 is an entry that is superordinate to the entry evicted from the TLB 606, i.e. the evicted entry in the TLB 606 relates to a memory region that is a subset of the memory region to which the entry in the walker cache 601 relates. Strictly speaking, this may mathematically speaking be either a strict subset or merely a subset (i.e. the latter case the two memory regions are the same). However, in most use-cases it is foreseen that the hierarchical nature of the page table information (pointers) cached in the walker cache and the address translations cached in the TLB will mean that the evicted entry in the TLB 606 will relate to a smaller memory region that is a strict subset of a larger memory region to which the entry in the walker cache 601 relates. Thus, when an entry in the TLB 606 is evicted, its "parent" entry in the walker cache 601 can be identified and, by signalling from the evictions monitor 607 to the counter control 604, the counter of the entry in the walker cache can be updated. It should further be noted that generally it is envisaged that the "parent" entry is that walker cache entry which is "directly superordinate" to the TLB entry, i.e. is immediately above it in the hierarchy, and walker cache entries in still higher hierarchy levels will not have their counters (if they have them) incremented, although this is also possible. Furthermore, relationships other than "directly superordinate" to the TLB entry are also envisaged, for example where a page walker cache contains L1 descriptors pointing to L2 tables, in which case the walker cache entry would not be directly superordinate to the TLB entry. It is to be noted that updates to the counter are made during the page table walk process (to generate the remainder of the full address translation) and therefore these updates are off the critical path for address translation.

In many examples, the counter control 604 is arranged to increment the counters of the entries in the walker cache when relevant events occur. Further, there may then be a defined threshold value for the counter control 604, whereby when a counter reaches this value, further actions are triggered (see below). Nevertheless, it is also contemplated that other configurations are equally viable, for example that for a new entry in the walker cache the counter is configured to have a starting value from which the counter control 604 is arranged to decrement the counter when relevant events occur, where the further actions are then triggered when a lower value (e.g. zero) is reached. Furthermore, in some examples the counter control 604 is arranged both to increment and to decrement a given counter, such as incrementing the counter when an eviction of a corresponding entry in the TLB 606 occurs and decrementing the counter each time re-use of a corresponding entry in the TLB 606 occurs. In such an arrangement, a rising counter value indicates that the corresponding entries in the TLB are being re-used more than evicted, whilst a falling counter value indicates that the corresponding entries in the TLB are being evicted more than re-used. Indeed more than one threshold value may be defined in association with such examples, such as setting first and second threshold values, whereby the criteria to be met comprises the counter first rising to meet the first threshold and then falling to meet the second threshold. The entries in the walker cache can also be provided with further associated information, such as shown in FIG. 6 by the saturation bit 609. This may be used in association with the counter value to define criteria when the counter control 604 will trigger further actions. For example, the saturation bit is set when the counter reaches its maximum value. The saturation bit remains set even when the counter then decreases (thus un-saturating) and this information can be used as part of defined criteria to trigger further actions. Alternatively or in addition, entries in the TLB 608 may be further annotated with a use indicator 608 to record whether the entry has been accessed since being cached. The use indicator may comprises a single bit or may comprise several bits, enabling more detailed use information to be captured. This information can then be used by the counter control 604, such as in examples where the corresponding counter in the walker cache is only incremented if the TLB entry was not reused after the initial access that brought it into the TLB.

The counter control 604 may be configured to modify the counter 603 of an entry in the walker cache 601 in response to a range of predefined events, of which an eviction in the TLB is just one example. Further, combined events may also be defined as the criteria for modifying the counter value, such as eviction with no re-use or eviction after re-use. Equally, re-use itself may be the basis for modifying the counter value, whether this is any re-use or only the first re-use of an entry. Where the counter 603 of an entry 602 in the walker cache will typically correspond to a set of possible entries in the TLB 606, counting the first re-use of any of the corresponding TLB entries will give an indication of how many of those TLB entries were re-used (but not whether they were each re-used many times). Accordingly, this configuration can be used to provide an indication of the coverage of the walker cache entry (though not the frequency of re-use of the covered TLB entries). By contrast, counting all re-uses of the multiple TLB entries covered by a walker cache entry provides an indication of the frequency of re-use across all the multiple TLB entries covered. However, this approach does not distinguish between one TLB entry being re-used often and many TLB entries being re-used once each. Hence, this option gives an indication of how heavily the walker cache entry (and the multiple TLB entries it covers) is being used, but not of the coverage per se.

The further actions that can be triggered by the counter control in dependence on a counter value can be variously configured. In the example of FIG. 6, insertion control 610 is provided which can control the insertion policy of either or both of walker cache 601 and TLB 606. Note that in some examples each of walker cache 601 and TLB 606 may be provided with their own separate insertion control. A single insertion control 610 shown for simplicity of illustration in FIG. 6. Thus, the insertion policy of either cache storage (walker cache 601 and/or TLB 606) can be modified in response to signalling from the counter control 604. For example, the respective cache storage could insert entries into the least-recently-used position instead of the most-recently-used position. Similarly, a choice of whether or not to cache certain entries at all can be controlled by the counter control 604. In one example, in response to a counter value in the walker cache 601 reaching a defined threshold, the counter control causes the TLB 606 (e.g. via the insertion control 610) not to cache corresponding entries. Thus, frequent evictions of a certain group of TLB entries may cause a particular counter (of an entry which is superordinate to those TLB entries) to count up to a threshold value, which triggers a modification of the caching policy for that group of TLB entries, namely to suppress their caching. As a result, rather than the TLB "thrashing" by inserting, evicting, re-inserting, and re-evicting these entries in rapid succession, better use of the TLB may be made by preserving its capacity for other entries. The insertion policy for certain entries in the walker cache 601 may be similarly modified (perhaps in response to different criteria). A further feature that may be implemented is that the counter control can be arranged to modify a counter value in a reverse direction to the direction used to count events for each elapse of a preset period. For example, where a walker cache counter is incremented for each corresponding TLB eviction, the counter control 604 can also be configured to decrement the counter each fixed period, noting this may be a "time" (e.g. every N clock cycles) or may also be defined in terms of the operation of the address translation circuitry (e.g. every N addresses translated). This allows the frequency of evictions, and not just the absolute number of evictions, to be taken into account. As a final point with regard to FIG. 6, it should be noted that although the configuration illustrated comprises a walker cache having entries with associated counters, where the counters are configured to count events relating to related subordinate entries in a TLB, the arrangements described are equally applicable to two walker cache levels, for example where an eviction of a walker cache entry corresponding to stage N of a page table walk causes an update of a counter for a stage N−1 walker cache entry. Note therefore that the evictions and the counters may be associated with the same wider cache storage (in examples where entries pertaining to different stages of the page table walk are cached in the same cache storage). In such a situation, the TLB 606 may be substituted by a further walker cache and indeed this further walker cache and the walker cache 601 may in fact be embodied by one larger combined walker cache.

Figure 7:
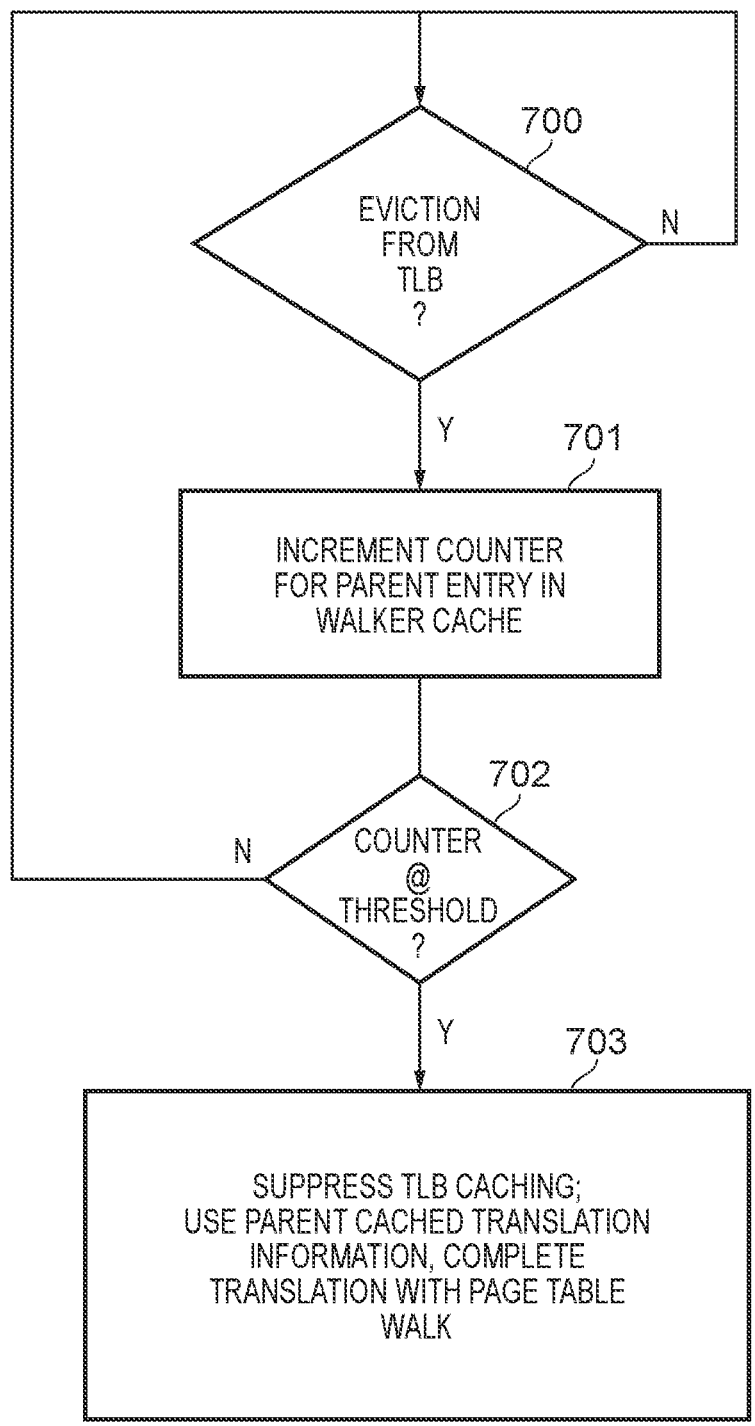
FIG. 7 shows a sequence of steps which are taken in the method of some examples.

FIG. 7 shows a sequence of steps which are taken in the method of some examples (which also corresponds to an arrangement such as that illustrated in FIG. 6). The flow can be considered to begin at step 700 at which it is determined whether there has been an eviction from the TLB and the flow loops on itself here until such an eviction occurs. When there is an eviction from the TLB, the flow proceeds to step 701 where the counter of the corresponding parent (superordinate) entry in the walker cache is updated (i.e. typically incremented, though in some examples the counter is a saturating counter, which at some point will saturate). Then at step 702 it is determined if the counter has reached a preset threshold. If it has not, then the flow loops back to step 700. If the threshold is met then the flow proceeds to step 703, where TLB caching for entries which are subordinate to this entry in the walker cache is suppressed. The pointers cached in the walker cache are used, but the remainder of the translation process is completed via the usual page table walk process. Step 703 then represents the state of system (with regard to these walker cache/TLB entries). Multiple subsequent translation requests which are subordinate to this walker cache entry are not cached in the TLB and instead are completed via a page table walk. At some point later, the counter for this walker cache entry is modified, either by the walker cache being evicted (and the counter value being lost) or, in examples where the counter value is stored when the walker cache entry is evicted, it may be retained and later reloaded. Alternatively, a timer mechanism may be provided to allow counter values to become "out of date" at some point (e.g. after a period without amendment) or to decay in value over time. In some examples the counters are never reset.

Figure 8:
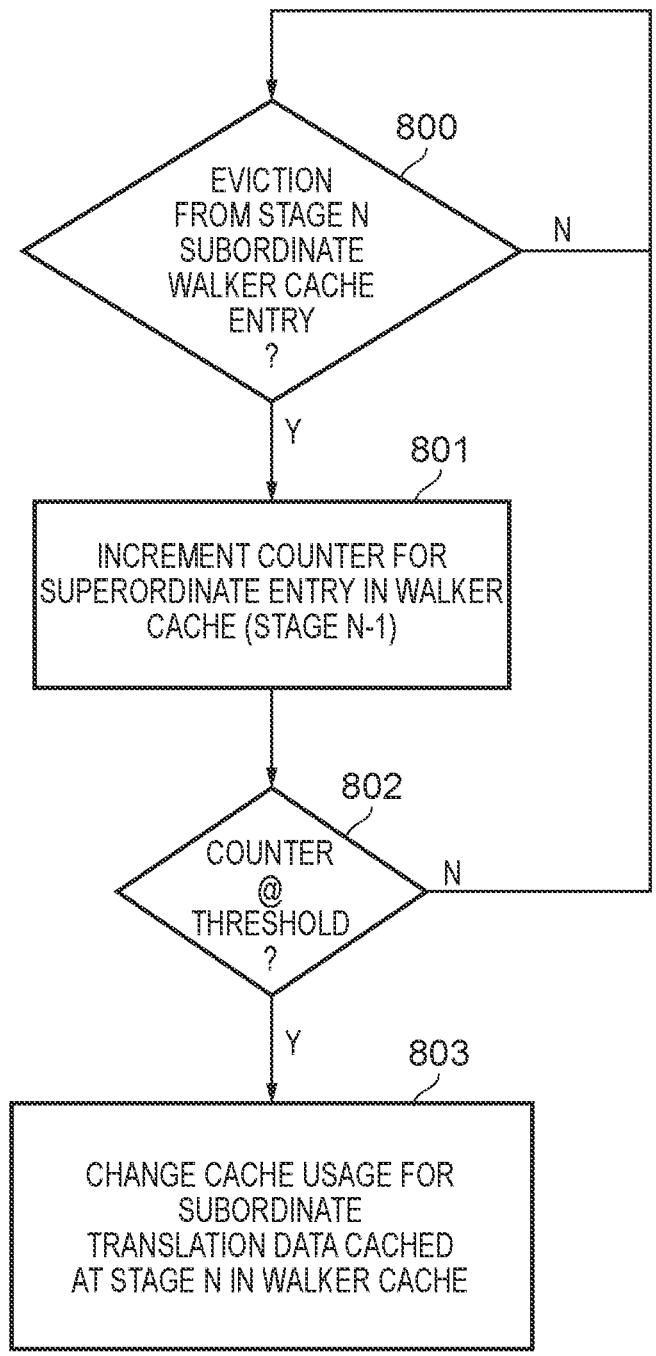
FIG. 8 shows a sequence of steps which are taken in the method of some examples.

FIG. 8 shows a sequence of steps which are taken in the method of some examples, where a similar arrangement to that which is the basis for FIG. 7 is present, although here the description relates to the variant mentioned above at the end of the description of FIG. 6, namely the present techniques being applied to two levels of a walker cache. The flow can be considered to begin at step 800 at which it is determined whether there has been an eviction from a stage N subordinate walker cache entry and the flow loops on itself here until such an eviction occurs. When there is an eviction from this level of the walker cache, the flow proceeds to step 801 where the counter of the corresponding parent (superordinate) entry in the walker cache (level N−1) is updated (i.e. typically incremented, unless saturated). Then at step 802 it is determined if the counter has reached a preset threshold. If it has not, then the flow loops back to step 800. If the threshold is met then the flow proceeds to step 803, where caching for entries which are subordinate to this entry in the walker cache is modified (e.g. caching of those subordinate entries may be suppressed). If required, the remainder of the translation process is completed via the usual page table walk process. Step 803 (similarly to step 703) then represents the state of system (with regard to these walker cache/TLB entries). Multiple subsequent translation requests which are subordinate to this walker cache entry are not cached in the TLB and instead are completed via a page table walk. At some point later, the counter for this walker cache entry is modified, either by the walker cache being evicted (and the counter value being lost) or, in examples where the counter value is stored when the walker cache entry is evicted, it may be retained and later reloaded. Alternatively, a timer mechanism may be provided to allow counter values to become "out of date" at some point (e.g. after a period without amendment) or to decay in value over time. In some examples the counters are never reset.

Figure 9A:
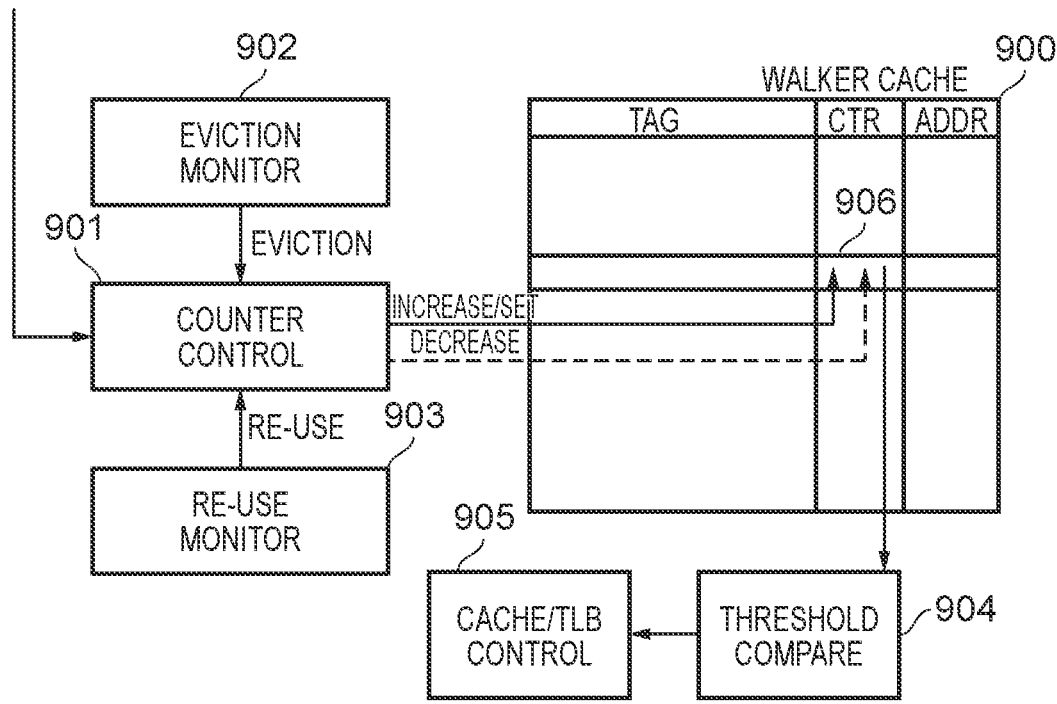
FIG. 9A schematically illustrates the use of counter control circuitry in association with walker cache storage in address translation circuitry in accordance with some examples.

FIG. 9A schematically illustrates the use of counter control circuitry in association with walker cache storage 900 in address translation circuitry in accordance with some examples. As described above, counter control circuitry 901 is provided in association cache storage, which in this example is represented by the walker cache 900. Eviction monitor 902 and re-use monitor 903 monitor evictions of and re-use of cached translation information entries that are subordinate to the entries of the walker cache 900. As described above these subordinate entries may correspond to a subsequent page table level, for which the retrieved translation information may be cached in another walker cache, or they may correspond to address translations themselves, which are cached in a TLB. Thus, in dependence on the evictions and re-uses of the relevant subordinate cached entries, the counter control 902 updates the counter value 906 (by increasing the counter value; and in some examples by decreasing the counter value). The value of the counter is compared (by threshold comparator 904) with a preset threshold and when this threshold is met the relevant cache or TLB control 905 is signalled, such that modification of the cache usage for the relevant subordinate cached entries can be implemented. FIG. 9A additionally shows that the counter control 901 is arranged to receive a "set counter" signal. This signal may be generated by a range of sources and in particular the source may be a hardware or a software component of the wider system to which this address translation circuitry belongs. In response to the "set counter" signal the counter control 901 directly sets the counter 906 to a software/operating system selected value. This may be an intermediate value, serving to pre-bias the counter, or could be directly to its maximum value, which thus causes the threshold comparison to be fulfilled, and the resulting modification of the caching of the relevant subordinate cached entries to be implemented. Thus, the counter control 901 may receive a "set counter" signal generated by software or by the operating system. This mechanism may for example be deployed when it is known that address translations in a particular region of memory will exhibit poor caching behaviour and the counter (or more generally just an indicator) can be proactively set to modify the cache usage for this particular region of memory, e.g. to suppress caching these entries at all.

Figure 9B:
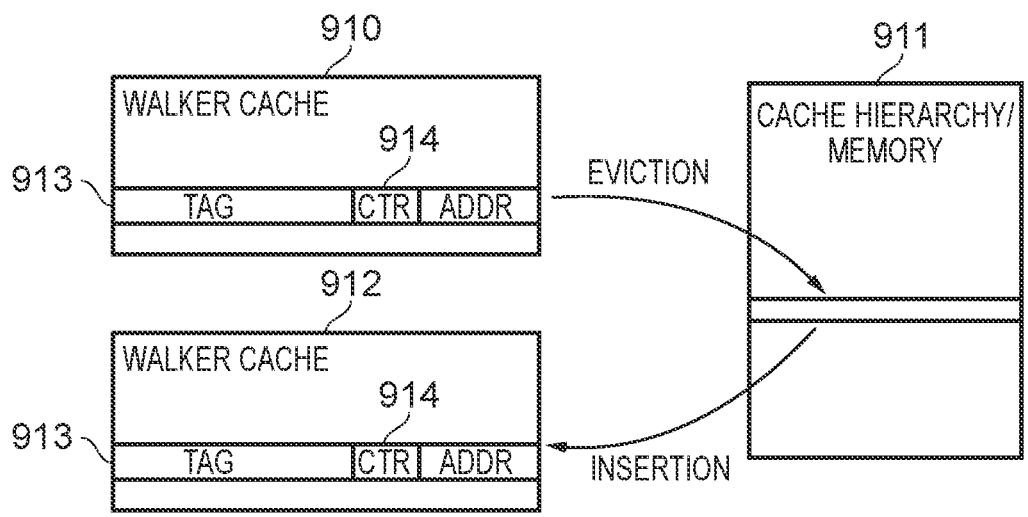
FIG. 9B schematically illustrates the eviction of an entry from walker cache storage and the reinstatement of that entry in accordance with some examples.

FIG. 9B schematically illustrates the eviction of an entry from walker cache storage and the reinstatement of that entry in accordance with some examples. An entry 913 in walker cache 910 has its counter 914 updated over the period that the entry is present in the cache. At some point, in accordance with the cache replacement policy operated by the walker cache 910, the entry 913 is evicted. As shown in FIG. 9B, when this entry is evicted it may be written back to a cache hierarchy and/or memory 911 including the latest value of the counter 914. Later, when the corresponding translation information is required again, this entry can be reinstated by insertion into the walker cache 912 (note that walker cache 910 and walker cache 912 may represent the same walker cache but at two different time points). Accordingly, in such an example, when the entry 913 is inserted into the walker cache 912, the value of the counter 914 can remain that which the counter had attained immediately prior to its eviction from walker cache 910. This enables the experience built up over the period that the entry 913 was present in the walker cache 910 not to be lost. In other examples, instead of being written back to memory in the usual sense, when the entry 913 is evicted the corresponding page table entry may be updated to at least partially capture the information represented by the counter 914 prior to eviction. Whilst in principle the explicit counter value 914 could be stored in the page table entry, in some examples it may be preferable to reduce the size of the information (due to limited space available for such additional information in the page table entry), e.g. by truncation or even reduction to a single bit. Accordingly, a reduced version of the counter, such as a single bit which indicates "re-use expected" or "re-use not expected" can be written back. This bit can then be used to set a suitably biased initial value of the counter when the page table entry is reloaded from memory. In the most simple example, the counter 914 is no more than a binary indicator, which was set at some point when the entry 913 was present in the walker cache 910. Then, when the entry 913 is reinstated in the walker cache 912, the counter (indicator) 914 remains set. Thus, where it has already been "learned" that the subordinate entries to entry 913 consistently exhibit poor caching behaviour when entry 913 is in the walker cache 910, this "knowledge" is immediately reinstated for the walker cache 912 and does not need to be "re-learnt".

Figure 10:
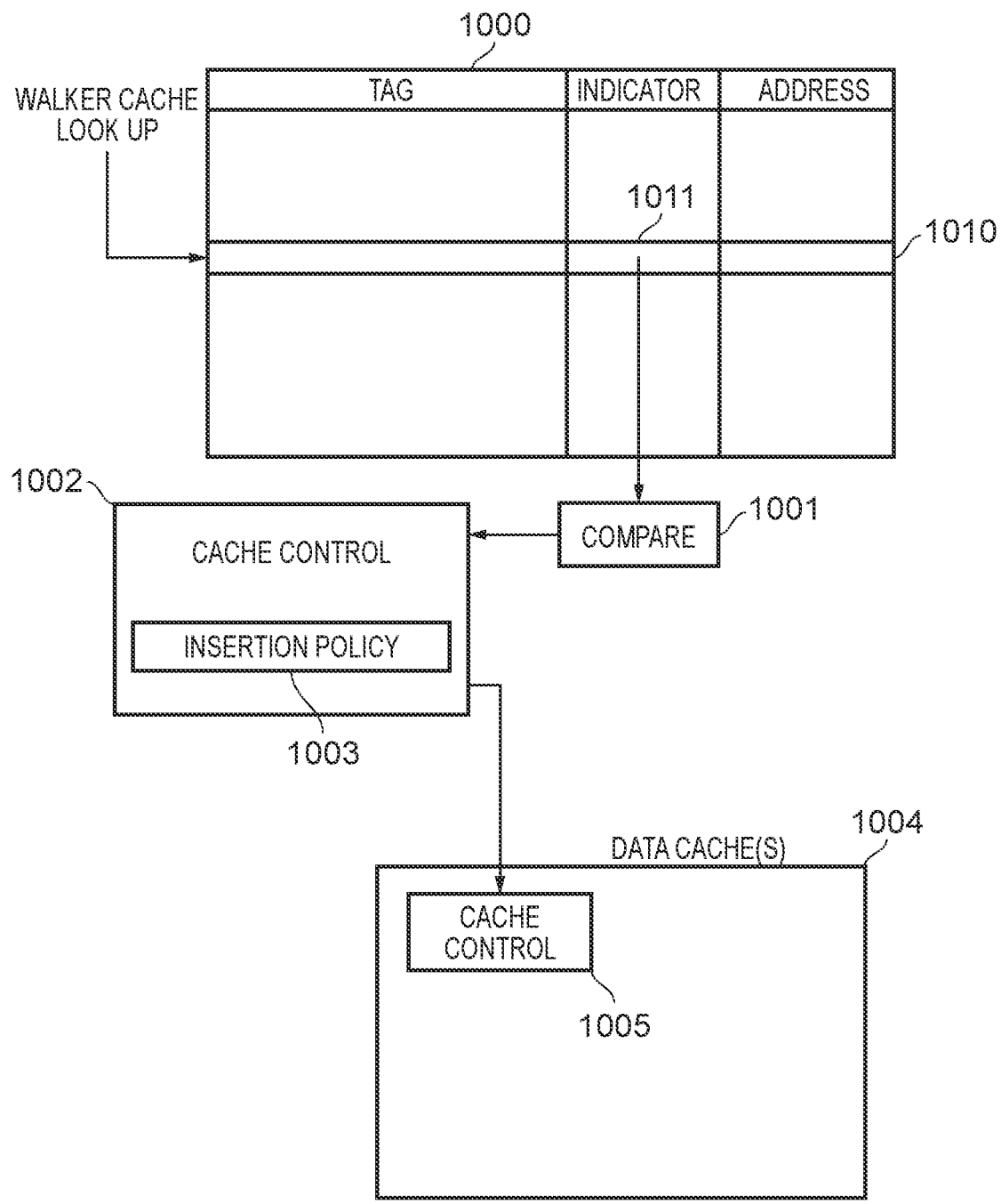
FIG. 10 schematically illustrates the use of a re-use indicator in address translation circuitry to modify the cache control of a data cache in accordance with some examples.

FIG. 10 schematically illustrates the use of a re-use indicator in address translation circuitry to modify the cache control of a data cache in accordance with some examples. A walker cache 1000 is shown, wherein a lookup in the walker cache hits on a particular entry 1010, which comprises a re-use indicator 1011 in accordance with the present techniques. The value of this re-use indicator 1011 (which may either be a simple binary indicator or a multi-value counter as variously described above) is compared by comparison unit 1001 with a threshold value, as a result of which cache control 1002 may be caused to modify the cache usage for the cache that it controls, e.g. by variation of the insertion policy 1003. As shown in FIG. 10, the cache control 1002 (which relates to the control of a cache storing address translation information) also signals to the cache control 1005 of the data cache(s) 1004. Thus, when the cache control 1002 modifies the cache usage for the cache that it controls, it can also signal this fact to the cache control 1005 of the data cache(s) 1004. As a result, the cache usage of the data cache(s) 1004 can also be modified, in particular for entries in the data cache(s) 1004 that are associated by data processing operations with the translation information for which the cache control 1002 modifies the cache usage. This is because it is further recognised by the present techniques that when poor cache usage for certain address translation information occurs, poor cache usage may also occur of data caches for data values stored at addresses to which that address translation information relates. Improved usage of the data caches 1004 can therefore also result from the present techniques.

Figure 11:
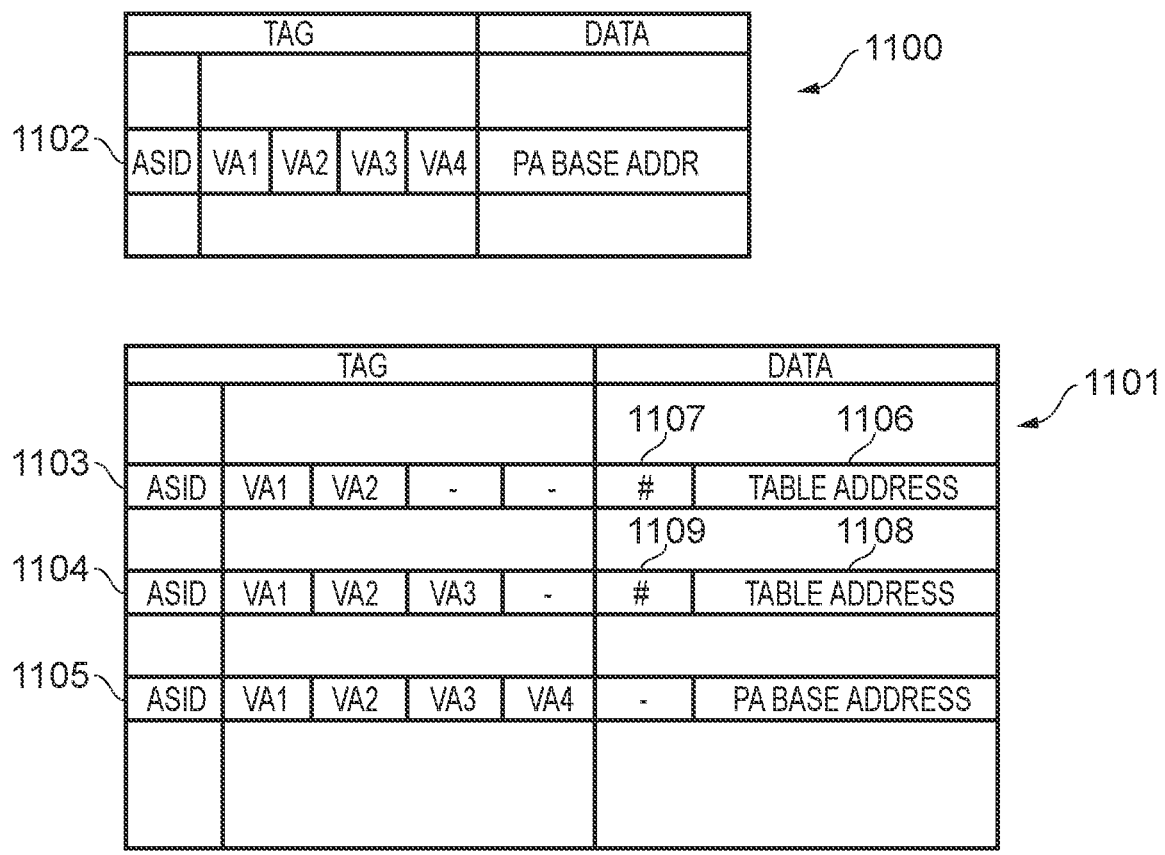
FIG. 11 schematically illustrates two cache storage components, which are provided in accordance with some examples.

FIG. 11 schematically illustrates two cache storage components, which are provided in accordance with some examples. The components are a micro-TLB 1100, configured to cache full address translation information and a partitioned L2 TLB/walker cache 1101 configured to either cache partial translation information or to cache full address translation information (depending on the partition). Micro-TLB 1100 is shown with an example entry 1102 comprising the full set of virtual address portions used for page table lookups (VA1-VA4) in the tag portion, where a hit on this set results in the provision of the full address translation, i.e. the physical address (PA) base address (with which the final offset portion of the virtual address is combined to give the specific fully translated physical address). The partitioned L2 TLB/walker cache 1101 is shown with three example entries, the first two 1103 and 1104 being partial translation entries and the third 1105 being a full address translation entry. Entry 1103 comprises the VA1 and VA2 virtual address portions in the tag portion, where a hit on this entry provides the page table address 1106 of the entry. The entry also comprises a counter 1107, by means of which the number of hits on this partial translation that caused a walker cache eviction (at the next, subordinate level of the page table hierarchy) is counted. When this counter reaches a threshold (e.g. saturates) caching of walker cache entries for the next, subordinate level of the page table hierarchy is suppressed. Entry 1104 comprises the VA1, VA2, and VA3 virtual address portions in the tag portion, where a hit on this entry provides the page table address 1108 of the entry. This entry also comprises a counter 1109, by means of which the number of hits on this partial translation that caused a micro-TLB 1100 eviction (of a full translation entry) is counted. When this counter reaches a threshold (e.g. saturates) the full address translation is not inserted in the micro-TLB 1100. Alternatively, counter 1109 can be used to count the number of hits on this partial translation that caused an eviction of a full translation entry from a full address translation entry (such as 1105) of the partitioned L2 TLB. When multiple TLB cache structures are provided, such as is the case in FIG. 11, the suppression of TLB caching can take various forms. For example, one approach could be to suppress the caching of full address translations in all TLB structures. In another approach, L2 TLB caching is suppressed when poor re-use is detected, whilst maintaining L1 TLB caching, because the L1 TLB is smaller and used for short term usage patterns, while the larger L2 TLB is more associated with the longer term usage patterns.

Various configurations of the present techniques are set out in the following numbered clauses:

Clause 1. Address translation circuitry responsive to receipt of a first address to perform address translation to generate a second address, the address translation circuitry comprising:
- a page walk controller configured to perform sequential page table lookups in a plurality of page table levels of a page table hierarchy, wherein pointers retrieved from preceding page table levels point to subsequent page table levels and the page walk controller is configured to use corresponding address portions of the first address to select the pointers from the preceding page table levels; and
- cache storage configured to cache entries comprising translation information retrieved by the sequential page table lookups;
- wherein an entry in the cache storage further comprises in association with the translation information a re-use indicator indicative of a re-use expectation for subsequent information which is subordinate to the translation information of the entry in the page table hierarchy, and wherein the address translation circuitry is configured to modify cache usage for the subsequent information in dependence on the re-use indicator.

Clause 2. The address translation circuitry as defined in Clause 1, wherein the cache storage is walker cache storage and the translation information comprised in the entries comprises the pointers retrieved as part of the sequential page table lookups in association with the corresponding address.

Clause 3. The address translation circuitry as defined in Clause 1 or Clause 2, further comprising a translation lookaside buffer configured to cache first-to-second address translations, wherein the subsequent information which is subordinate to the translation information of the entry in the page table hierarchy comprises at least one first-to-second address translation cached in the translation lookaside buffer.

Clause 4. The address translation circuitry as defined in any preceding Clause, wherein the re-use indicator comprises a counter, wherein a value indicated by the counter is configured to be modified in response to a predefined event relating to at least part of the subsequent information and wherein the address translation circuitry is configured to modify the cache usage for the subsequent information when a result of modification of the value of the counter satisfies a predefined criterion.

Clause 5. The address translation circuitry as defined in Clause 4, wherein the predefined event comprises a caching eviction of the at least part of the subsequent information.

Clause 6. The address translation circuitry as defined in Clause 5, wherein prior to the caching eviction the at least part of the subsequent information has not been re-used after an initial access which cause it to be cached.

Clause 7. The address translation circuitry as defined in any of Clauses 4-6, wherein the counter is a saturating counter configured to saturate at a threshold value.

Clause 8. The address translation circuitry as defined in Clause 7, further comprising a saturation indicator configured to indicate that the saturating counter has reached the threshold value.

Clause 9. The address translation circuitry as defined in any of Clauses 4-8, wherein the counter is configured to be periodically modified in a reverse direction.

Clause 10. The address translation circuitry as defined in Clause 8, wherein the predetermined criterion comprises saturation of the counter followed by return to a further threshold value.

Clause 11. The address translation circuitry as defined in any of Clauses 4-8, wherein the counter is configured to monotonically increment.

Clause 12. The address translation circuitry as defined in any of Clauses 4-10, wherein the counter is configured to be modified in a reverse direction in response to re-use of the subsequent information.

Clause 13. The address translation circuitry as defined in Clause 12, wherein the re-use of the subsequent information is a first re-use of the subsequent information.

Clause 14. The address translation circuitry as defined in any preceding Clause, wherein the re-use indicator comprises a settable value, and wherein the address translation circuitry is configured to modify cache usage for the subsequent information when the settable value meets at least one predefined criterion.

Clause 15. The address translation circuitry as defined in Clause 14, wherein the address translation circuitry is configured to modify the settable value in response to a software or operating system command to do so.

Clause 16. The address translation circuitry as defined in Clause 14 or Clause 15, wherein the address translation circuitry is configured to modify the settable value in response to eviction behaviour related to the subsequent information.

Clause 17. The address translation circuitry as defined in any preceding Clause, wherein the address translation circuitry is configured, when the entry is evicted from the cache storage to cause the re-use indicator to be evicted in association with the entry and written back to further storage, such that when the translation information is retrieved again as part of a later page table lookup the re-use indicator is also retrieved having a state it had when the entry was evicted.

Clause 18. The address translation circuitry as defined in any preceding Clause, wherein the cache storage is configured to suppress caching of the subsequent information in dependence on the re-use indicator.

Clause 19. The address translation circuitry as defined in any preceding Clause, wherein the address translation circuitry is configured to modify an insertion policy for the cache storage in dependence on the re-use indicator.

Clause 20. The address translation circuitry as defined in Clause 3, or in any of Clauses 4-19 when dependent on Clause 3, wherein the address translation circuitry is configured to modify an insertion policy for the translation lookaside buffer in dependence on the re-use indicator.

Clause 21. The address translation circuitry as defined in any preceding Clause, wherein the address translation circuitry is configured to signal information to a data cache control in dependence on the re-use indicator to cause the data cache control to modify cache usage for entries in a data cache which are associated by data processing operations with the subsequent information.

Clause 22. The address translation circuitry as defined in any preceding Clause, further comprising multiple translation lookaside buffers configured to cache first-to-second address translations,
- and wherein modifying the cache usage for the subsequent information in dependence on the re-use indicator comprises suppressing caching of address translations in a first one of the multiple translation lookaside buffers, but continuing to cache the address translations in a second one of the multiple translation lookaside buffers.

Clause 23. A method of address translation for receiving a first address and generating a second address, the method comprising:
- performing sequential page table lookups in a plurality of page table levels of a page table hierarchy, wherein pointers retrieved from preceding page table levels point to subsequent page table levels and corresponding address portions of the first address are used to select the pointers from the preceding page table levels;
- caching entries in cache storage comprising translation information retrieved by the sequential page table lookups,
- wherein an entry in the cache storage further comprises in association with the translation information a re-use indicator indicative of a re-use expectation for subsequent information which is subordinate to the translation information of the entry in the page table hierarchy; and
- modifying cache usage for the subsequent information in dependence on the re-use indicator.

In brief overall summary, address translation circuitry is provided to perform address translation on receipt of a first address to generate a second address. The address translation circuitry comprises a page walk controller configured to perform sequential page table lookups in a plurality of page table levels of a page table hierarchy. Portions of the first address are used to index into sequential page table levels. Cache storage is provided to cache entries comprising translation information retrieved by the sequential page table lookups. An entry in the cache storage further comprises in association with the translation information a re-use indicator indicative of a re-use expectation for subsequent information, which is subordinate to the translation information of the entry in the page table hierarchy. The address translation circuitry is configured to modify cache usage for the subsequent information in dependence on the re-use indicator.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. Address translation circuitry responsive to receipt of a first address to perform address translation to generate a second address, the address translation circuitry comprising:
- a page walk controller configured to perform sequential page table lookups in a plurality of page table levels of a page table hierarchy, wherein pointers retrieved from preceding page table levels point to subsequent page table levels and the page walk controller is configured to use corresponding address portions of the first address to select the pointers from the preceding page table levels; and
- cache storage configured to cache entries comprising translation information retrieved by the sequential page table lookups;
- wherein an entry in the cache storage further comprises in association with the translation information a re-use indicator indicative of a re-use expectation for subsequent information which is subordinate to the translation information of the entry in the page table hierarchy,
- and wherein the address translation circuitry is configured to modify cache usage for the subsequent information in dependence on the re-use indicator.

2. The address translation circuitry as claimed in claim 1, wherein the cache storage is walker cache storage and the translation information comprised in the entries comprises the pointers retrieved as part of the sequential page table lookups in association with the corresponding address.

3. The address translation circuitry as claimed in claim 1, further comprising a translation lookaside buffer configured to cache first-to-second address translations, wherein the subsequent information which is subordinate to the translation information of the entry in the page table hierarchy comprises at least one first-to-second address translation cached in the translation lookaside buffer.

4. The address translation circuitry as claimed in claim 1, wherein the re-use indicator comprises a counter, wherein a value indicated by the counter is configured to be modified in response to a predefined event relating to at least part of the subsequent information and wherein the address translation circuitry is configured to modify the cache usage for the subsequent information when a result of modification of the value of the counter satisfies a predefined criterion.

5. The address translation circuitry as claimed in claim 4, wherein the predefined event comprises a caching eviction of the at least part of the subsequent information.

6. The address translation circuitry as claimed in claim 5, wherein prior to the caching eviction the at least part of the subsequent information has not been re-used after an initial access which cause it to be cached.

7. The address translation circuitry as claimed in claim 4, wherein the counter is a saturating counter configured to saturate at a threshold value.

8. The address translation circuitry as claimed in claim 7, further comprising a saturation indicator configured to indicate that the saturating counter has reached the threshold value.

9. The address translation circuitry as claimed in claim 4, wherein the counter is configured to be periodically modified in a reverse direction.

10. The address translation circuitry as claimed in claim 8, wherein the predetermined criterion comprises saturation of the counter followed by return to a further threshold value.

11. The address translation circuitry as claimed in claim 4, wherein the counter is configured to be modified in a reverse direction in response to re-use of the subsequent information.

12. The address translation circuitry as claimed in claim 11, wherein the re-use of the subsequent information is a first re-use of the subsequent information.

13. The address translation circuitry as claimed in claim 1, wherein the re-use indicator comprises a settable value, and wherein the address translation circuitry is configured to modify cache usage for the subsequent information when the settable value meets at least one predefined criterion.

14. The address translation circuitry as claimed in claim 13, wherein the address translation circuitry is configured to modify the settable value in response to a software or operating system command to do so.

15. The address translation circuitry as claimed in claim 14, wherein the address translation circuitry is configured to modify the settable value in response to eviction behaviour related to the subsequent information.

16. The address translation circuitry as claimed in claim 1, wherein the cache storage is configured to suppress caching of the subsequent information in dependence on the re-use indicator.

17. The address translation circuitry as claimed in claim 1, wherein the address translation circuitry is configured to modify an insertion policy for the cache storage in dependence on the re-use indicator.

18. The address translation circuitry as claimed in claim 3, wherein the address translation circuitry is configured to modify an insertion policy for the translation lookaside buffer in dependence on the re-use indicator.

19. The address translation circuitry as claimed in claim 1, further comprising multiple translation lookaside buffers configured to cache first-to-second address translations, and wherein modifying the cache usage for the subsequent information in dependence on the re-use indicator comprises suppressing caching of address translations in a first one of the multiple translation lookaside buffers, but continuing to cache the address translations in a second one of the multiple translation lookaside buffers.

20. A method of address translation for receiving a first address and generating a second address, the method comprising:

performing sequential page table lookups in a plurality of page table levels of a page table hierarchy, wherein pointers retrieved from preceding page table levels point to subsequent page table levels and corresponding address portions of the first address are used to select the pointers from the preceding page table levels;

caching entries in cache storage comprising translation information retrieved by the sequential page table lookups, wherein an entry in the cache storage further comprises in association with the translation information a re-use indicator indicative of a re-use expectation for subsequent information which is subordinate to the translation information of the entry in the page table hierarchy; and modifying cache usage for the subsequent information in dependence on the re-use indicator.

* * * * *